Feb. 27, 1962 H. MULTER ETAL 3,023,016
LIGHTWEIGHT CHUCK
Filed Nov. 30, 1959 2 Sheets-Sheet 1

INVENTORS
HOWARD MULTER
BY JOHN J. RODDY

*Lindsey and Prutzman*
ATTORNEYS

Feb. 27, 1962 H. MULTER ETAL 3,023,016
LIGHTWEIGHT CHUCK
Filed Nov. 30, 1959 2 Sheets-Sheet 2

INVENTORS
HOWARD MULTER
BY JOHN J. RODDY

Lindsey and Prutzman
ATTORNEYS ically easy to move about and position relative to an associated machine and very effective, etc.

United States Patent Office 3,023,016
Patented Feb. 27, 1962

3,023,016
LIGHTWEIGHT CHUCK
Howard Multer, West Hartford, and John J. Roddy, Meriden, Conn., assignors to Skinner Precision Industries, Inc., New Britain, Conn., a corporation of Connecticut
Filed Nov. 30, 1959, Ser. No. 856,040
4 Claims. (Cl. 279—116)

This invention relates to chucks for welding equipment and the like and is more particularly concerned with an improved chuck of light weight suitable for use with comparatively large objects where large jaw pressures are not desired or required.

It is a general object of this invention to provide a novel and improved chuck for use with large diameter objects such as barrels, pipes, tanks, and the like, which chuck is extremely light in weight, very economical to manufacture, exceptionally easy to move about and position relative to an associated machine and very effective and reliable in operation, particularly when compared with conventionally constructed chucks suitable for use with comparably sized workpieces.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
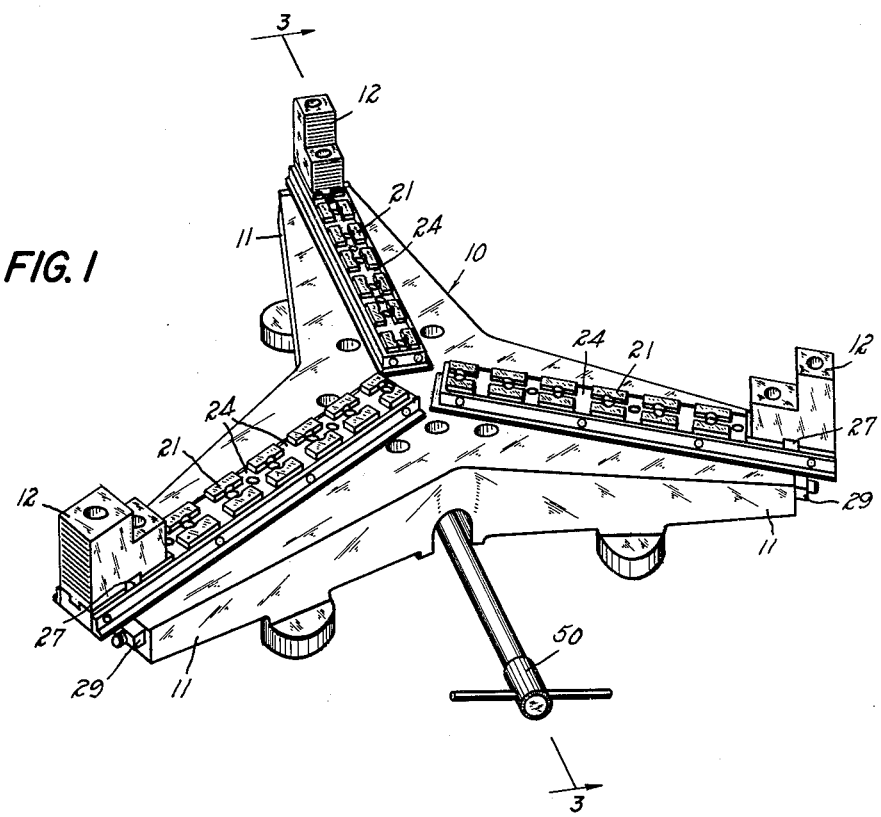
FIG. 1 is a perspective view of a preferred embodiment of the lightweight chuck of this invention.

Referring to the drawings and particularly to FIG. 1, it is seen that my improved chuck is characterized by a spider or housing 10, having three equally spaced equal length arms 11 extending outwardly from the center of the body, each arm supporting a clamping jaw 12 which is movable, as hereinafter explained, into clamping and supporting engagement with a workpiece whose maximum dimensions far exceed the dimensions of the chuck operating mechanism generally designated 14 which is supported and contained within a centrally located recess 15 in body 10.

Figure 2:
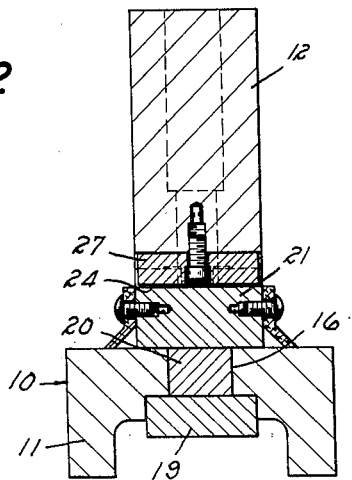
FIG. 2 is a cross section view taken generally along the line 2—2 of FIG. 3.
Figure 3:
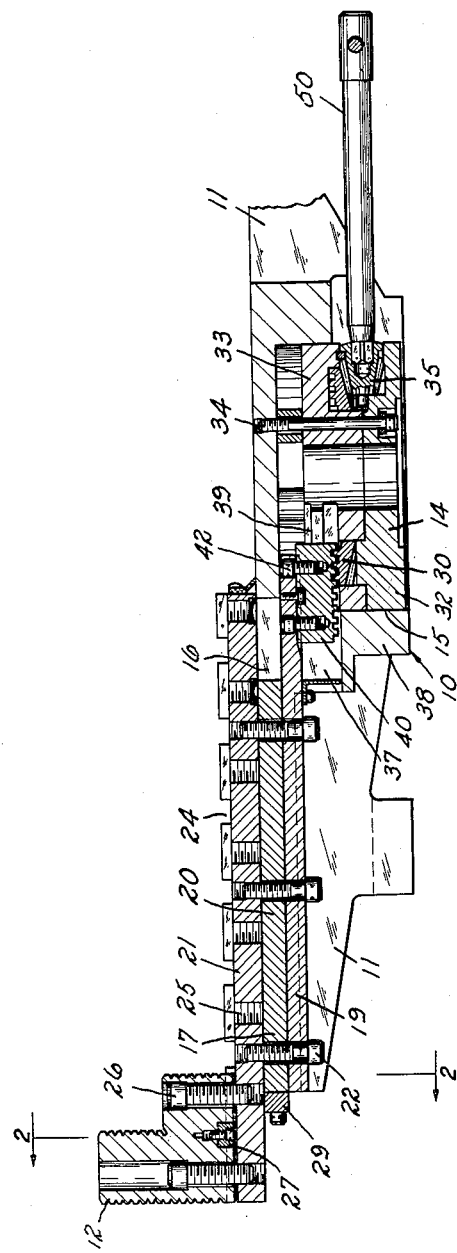
FIG. 3 is a cross section view taken generally along the line 3—3 of FIG. 1.

In the illustrated preferred embodiment of my invention, housing 10 is a unitary shell-like casting having jaw guide slots 16 milled or otherwise formed in each arm 11 throughout the length thereof and extending into generally cylindrical recess 15 formed in the central portion of the chuck body. A clamping jaw operating bar 17 is slidably mounted in the slot in each arm and, as best seen in FIGS. 2 and 3, each bar 17 generally comprises an intermediate jaw binder 19, a jaw spacer strip 20, and an intermediate jaw 21 which are held together as a unitary structure by threaded fasteners 22. The cross section shape of each operating bar 17 is generally that of an H with intermediate jaw 21 sliding on the upper surface of the arms 11 and guided for movement laterally of the center of the jaw by intermediate jaw 21 and jaw binder 19. It is noted at this point, that each intermediate jaw 21 is provided with a plurality of keyways 24 extending laterally thereof and a plurality of threaded passageways 25 which cooperate with bolts 26 extending through clamping jaw 12 to adjustably position each jaw 12 along the length of each bar 17 as desired. A key 27 is secured to the underside of each clamping jaw 12 by a threaded fastener to assist in fixedly positioning the clamping jaw in the preadjusted position on bar 17. A reinforcing strip 29 is secured to the end of each arm to close the slot as well as to prevent spreading of the slot.

In order to effect controlled movement of each operating bar 17 radially of the center of chuck body 10, there is provided in central body recess 15 a chuck operating mechanism comprising a scroll plate 30 having a beveled gear on its bottom surface, which scroll plate is positioned by backing plate or lower frame member 32 and upper frame member 33 for rotational movement by rotation of operating pinion 35. As most clearly seen in FIG. 3, frame members 32 and 33 are fastened to housing 10 by bolts 34 (one of which is shown in FIG. 3) and are provided with grooved surfaces which cooperate to define a generally annular recess in which scroll plate 30 is positioned and guided for rotary movement. Each intermediate jaw binder 19 extends through slot 37 aligned therewith and formed in the side wall 38 of central recess 15. A guide groove 39 in upper frame member 33 is aligned with each slot 37 and a master jaw 40 is disposed therein and fastened to the aligned jaw binder by fasteners 42. Each slot 37 and groove 39 is dimensioned to permit sliding movement of master jaw 40 relative thereto so that, upon rotation of pinion 35 and scroll plate 30, each master jaw 40 is moved radially of the scroll plate to effect simultaneous movement of each clamping jaw 12. To facilitate operation of the chuck mechanism, elongated pinion driver 50 is provided.

From the foregoing description of the structure and operation of the preferred embodiment of my invention, it is apparent that I have provided a chuck capable of holding objects which are very large in comparison to the chuck operating mechanism. While it is not unusual to have chucks for holding large objects, it is customary that these chucks utilize body members and operating mechanisms which are nearly as large as the radial spacing between the jaws. Thus, the chucks of the prior art have not only been extremely heavy, difficult to move and operate, but have also been so expensive as to severely limit use with welding machines and the like. The chuck of this invention has particular utility with automatic or semi-automatic welding machines where it is essential that extremely large objects, often light in weight, be firmly grasped and accurately controlled into position with a minimum expenditure of labor and materials. This chuck provides the durability and versatility necessary for many applications which do not require the extreme accuracy and attendant massive structure and high expense of conventional chucks.

As will be apparent to persons skilled in the art, various modifications and adaptations of the structure above described will become readily apparent without departure from the spirit and scope of the invention, the scope of which is defined in the appended claims.

We claim:

1. A lightweight chuck for large diameter workpieces such as barrels, tanks, pipes and the like comprising a housing having a central body section and three arms extending radially outwardly therefrom, three operating bars, means slidably mounting one of said operating bars on each of said arms for movement radially of the central body section, a clamping jaw mounted on each of said operating bars outwardly of the central body section, a scroll plate, means rotatably mounting said scroll plate in said central body section, means on each of said operating arms engaged with said scroll plate for movement radially in response to rotation of the scroll plate, and means for rotating said scroll plate to simultaneously move the operating bars and clamping jaws along said arms radially of the body section.

2. A lightweight chuck for large diameter workpieces such as barrels, tanks, pipes and the like comprising a housing having a central body section and three arms extending radially outwardly therefrom, said central body section having a recess in the bottom thereof, a slot in each of said arms extending radially outwardly from the central body section through substantially the entire length of the arm, a radially extending passageway in the side wall of said central body section communicating between each of said slots and said recess, a scroll plate rotatably mounted in said recess, a master jaw positioned in each said passageway for radial movement in response to rotation of the scroll plate and having a toothed face engaged with said scroll plate, an operating bar fastened to each said master jaw and slidably carried in each said arm slot for movement radially of the central body section, a clamping jaw mounted on each said operating bar outwardly of the central body section, and means for rotating said scroll plate to move said master jaw and thereby move the clamping jaws radially of the central body section.

3. A lightweight chuck for large diameter workpieces such as barrels, tanks, pipes and the like comprising a unitary housing shell having a central body section and three arms extending radially outwardly therefrom, said central body section having a recess in the bottom thereof, a slot in each said arms extending outwardly from the central body section through substantially the entire length of each arm, a radially extending passageway in the side wall of said body section communicating between each said slot and said recess, an upper frame member and a backing plate positioned in said body recess and secured to said housing shell, said inner housing member and backing plate cooperating to define an annular chamber, a scroll plate rotatably mounted in said annular chamber, radial guide channels in said inner housing member overlying said scroll plate and extending radially outwardly thereof, one of said radial guide channels being positioned in registry with each of said passageway and arm slots, a master jaw slidably carried in said radial guide channel and having a toothed face engaged with said scroll plate, outwardly extending operating bars slidably carried in said arm slots and fastened to said master jaw for movement radially of the central body section, a clamping jaw mounted on each of said operating arms outwardly of the central body section, and means for rotating said scroll plate to simultaneously move each of said master jaws radially in said radial guide channels thereby to move the clamping jaws radially of the central body section.

4. A lightweight chuck for large diameter workpieces such as barrels, tanks, pipes and the like comprising a unitary shell-like housing having a central body section and multiple arms extending radially outwardly therefrom, said central body section having a recess in the bottom thereof, an operating bar slidably mounted on each of said arms for movement radially of the central body section, a clamping jaw mounted on each of said operating bars, a chuck operating mechanism mounted in the recess in said central body section, means connecting said chuck operating mechanism to each said operating bar to effect slidable movement of said operating bar along the respective arm, and means for operating the mechanism to move the clamping jaws radially of the body section.

References Cited in the file of this patent

UNITED STATES PATENTS

| | | |
|---|---|---|
| 295,229 | Colton | Mar. 18, 1884 |
| 670,263 | Whiton | Mar. 19, 1901 |
| 2,904,339 | Swanson | Sept. 15, 1959 |